United States Patent
Shannon et al.

(10) Patent No.: US 6,893,537 B2
(45) Date of Patent: May 17, 2005

(54) TISSUE PRODUCTS CONTAINING A FLEXIBLE BINDER

(75) Inventors: Thomas G. Shannon, Neenah, WI (US); David A. Moline, Appleton, WI (US); Jim D. Lorenz, Neenah, WI (US); Lisa A. Flugge, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 249 days.

(21) Appl. No.: 09/943,412

(22) Filed: Aug. 30, 2001

(65) Prior Publication Data

US 2003/0077314 A1 Apr. 24, 2003

(51) Int. Cl.$^7$ .................. D21H 17/33; D21H 17/59
(52) U.S. Cl. ............... 162/164.4; 162/168.1; 162/168.2; 162/168.3
(58) Field of Search ............ 162/164.4, 168.1, 162/168.2, 168.3

(56) References Cited

U.S. PATENT DOCUMENTS

| | | |
|---|---|---|
| 2,345,543 A | 3/1944 | Wohnsiedler et al. |
| 2,926,116 A | 2/1960 | Keim |
| 2,926,154 A | 2/1960 | Keim |
| 3,556,932 A | 1/1971 | Coscia et al. |
| 3,556,933 A | 1/1971 | Williams et al. |
| 3,700,623 A | 10/1972 | Keim |
| 3,772,076 A | 11/1973 | Keim |
| 4,348,454 A | 9/1982 | Eckberg |
| 4,603,176 A | 7/1986 | Bjorkquist et al. |
| 5,048,589 A | 9/1991 | Cook et al. |
| 5,129,988 A | 7/1992 | Farrington, Jr. |
| 5,227,242 A | 7/1993 | Walter et al. |
| 5,385,643 A | 1/1995 | Ampulski |
| 5,399,412 A | 3/1995 | Sudall et al. |
| 5,466,337 A | 11/1995 | Darlington et al. |
| 5,480,634 A | 1/1996 | Hayama et al. |
| 5,494,554 A | 2/1996 | Edwards et al. |

(Continued)

FOREIGN PATENT DOCUMENTS

| | | |
|---|---|---|
| EP | 541511 A2 | 12/1993 |
| EP | 938886 A2 | 1/1999 |

(Continued)

OTHER PUBLICATIONS

Int'l Search Report for Int'l Appl. No. PCT/US 02/23331 dated Nov. 13, 2002.

*Primary Examiner*—Peter Chin
(74) *Attorney, Agent, or Firm*—Dority & Manning, P.A.

(57) ABSTRACT

A tissue product that has a relatively low level of lint and slough is provided. For example, the tissue product contains a flexible binder copolymer that is at least formed from an ethylenically unsaturated monomeric constituent and an unsaturated polysiloxane monomeric constituent. In one particular embodiment, the unsaturated polysiloxane monomeric constituent includes at least one unsaturated polysiloxane monomer having the following formula:

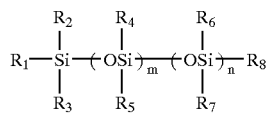

wherein, $R_1$ is an ethylenically unsaturated group that has free radical polymerizability; $R_2$, $R_3$, $R_4$, $R_5$, $R_6$, $R_7$, and $R_8$ are the same or different and can be selected from the group consisting of hydrogen, an aryl group, an alkyl group, a substituted alkyl or aryl group, an ethoxy group, and a propoxy group; m is an integer from 4 to 15,000; and n is an integer from 0 to 15,000.

31 Claims, 2 Drawing Sheets

U.S. PATENT DOCUMENTS

| | | |
|---|---|---|
| 5,510,001 A | 4/1996 | Hermans et al. |
| 5,529,665 A | 6/1996 | Kaun |
| 5,558,873 A | 9/1996 | Funk et al. |
| 5,573,637 A | 11/1996 | Ampulski et al. |
| 5,591,309 A | 1/1997 | Rugowski et al. |
| 5,641,835 A | 6/1997 | Smith et al. |
| 5,667,636 A | 9/1997 | Engel et al. |
| 5,789,516 A | 8/1998 | Graiver et al. |
| 5,814,188 A | 9/1998 | Vinson et al. |
| 5,830,317 A | 11/1998 | Vinson et al. |
| 5,851,352 A | 12/1998 | Vinson et al. |
| 5,853,539 A | 12/1998 | Smith et al. |
| 5,916,547 A | 6/1999 | Torgerson et al. |
| 5,935,383 A | 8/1999 | Sun et al. |
| 5,954,921 A | 9/1999 | Dahmen et al. |
| 5,993,602 A | 11/1999 | Smith et al. |
| 5,993,604 A | 11/1999 | Finlayson et al. |
| 6,017,417 A | 1/2000 | Wendt et al. |
| 6,074,628 A | 6/2000 | Bolich, Jr. et al. |
| 6,096,152 A | 8/2000 | Anderson et al. |
| 6,177,063 B1 | 1/2001 | Hutchins |
| 6,224,714 B1 | 5/2001 | Schroeder et al. |

FOREIGN PATENT DOCUMENTS

| | | |
|---|---|---|
| WO | WO 0024852 A3 | 10/1999 |
| WO | WO 0024852 A2 | 10/1999 |
| WO | WO 0043440 A1 | 7/2000 |
| WO | WO 0148312 A1 | 7/2001 |

TISSUE PRODUCTS CONTAINING A FLEXIBLE BINDER

BACKGROUND OF THE INVENTION

Tissue products, such as facial tissues, paper towels, bath tissues, sanitary napkins, and other similar products, are designed to include several important properties. For example, the products should have good bulk, a soft feel, and good strength. However, when steps are taken to increase one property of the product, other characteristics of the product are often adversely affected.

For instance, it is very difficult to produce a high strength paper product that is also soft. In particular, strength is typically increased by the addition of certain strength or bonding agents to the product. Although the strength of the paper product is increased, various methods are often used to soften the product that can result in decreased fiber bonding. For example, chemical debonders can be utilized to reduce fiber bonding and thereby increase softness. Moreover, mechanical forces, such as creping or calendering, can also be utilized to increase softness.

However, reducing fiber bonding with a chemical debonder or through mechanical forces can adversely affect the strength of the paper product. For example, hydrogen bonds between adjacent fibers can be broken by such chemical debonders, as well as by mechanical forces of a papermaking process. Consequently, such debonding results in loosely bound fibers that extend from the surface of the tissue product. During processing and/or use, these loosely bound fibers can be freed from the tissue product, thereby creating lint, which is defined as individual airborne fibers and fiber fragments. Moreover, papermaking processes may also create zones of fibers that are poorly bound to each other but not to adjacent zones of fibers. As a result, during use, certain shear forces can liberate the weakly bound zones from the remaining fibers, thereby resulting in slough, i.e., bundles or pills on surfaces, such as skin or fabric. As such, the use of such debonders can often result in a much weaker paper product during use that exhibits substantial amounts of lint and slough.

As such, a need currently exists for a paper product that is strong, soft, and that also has low lint and slough.

SUMMARY OF THE INVENTION

In accordance with one embodiment of the present invention, a soft tissue product is provided that has a relatively low level of lint and slough. In particular, the tissue product comprises at least one paper web formed from a cellulosic fibrous material. Using any of a variety of different techniques, the paper web is applied with a flexible binder that is a copolymer formed from at least the following monomeric constituents:

a) Ethylenically Unsaturated Monomeric Constituent

The ethylenically unsaturated monomeric constituent can generally contain one or more ethylenically unsaturated monomers. For example, some examples of suitable ethylenically unsaturated monomers include acrylic acid, methacrylic acid, derivatives of acrylic acid, derivatives of methacrylic acid, and combinations thereof. In some embodiments, the ethylenically unsaturated monomeric constituent comprises greater than about 15% by weight of the total monomer weight of the copolymer.

Moreover, in one embodiment, the ethylenically unsaturated monomeric constituent can include a monomer having the following formula:

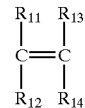

wherein, $R_{11}$, $R_{12}$, and $R_{13}$ are the same or different, and can be selected from the group consisting of hydrogen and a $C_1$–$C_4$ alkyl group; and $R_{14}$ is a hydrophobic group, such as an acrylic- or methacrylic-based ester having an alkyl chain length of $C_1$–$C_{40}$.

b) Unsaturated Polysiloxane Monomeric Constituent

The unsaturated polysiloxane monomeric constituent can generally contain one or more unsaturated polysiloxane monomers. In one embodiment, the unsaturated polysiloxane monomeric constituent includes an unsaturated polysiloxane monomer having the following formula:

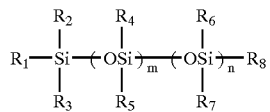

wherein, $R_1$ is an ethylenically unsaturated group that has free radical polymerizability; and $R_2$, $R_3$, $R_4$, $R_5$, $R_6$, $R_7$, and $R_8$ are the same or different, and can be selected from the group consisting of hydrogen, an aryl group, an alkyl group, a substituted alkyl or aryl group, an ethoxy group, and a propoxy group;

m is an integer from 4 to 15,000; and n is an integer from 0 to 15,000.

In one embodiment, for example, the unsaturated polysiloxane monomer can have the following formula:

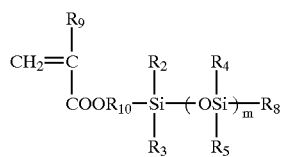

wherein, $R_2$, $R_3$, $R_4$, $R_5$, and $R_8$ are the same or different, and can be selected from the group consisting of hydrogen, an aryl group, an alkyl group, a substituted alkyl or aryl group, an ethoxy group, a propoxy group, and an amino group;

$R_9$ is hydrogen or a $C_1$–$C_4$ alkyl group;

$R_{10}$ is a $C_1$–$C_4$ alkyl or a $C_1$–$C_4$ alkylene group (e.g., $C_3H_6$); and m is between 4 to 500.

In some embodiments, the polysiloxane unsaturated monomeric constituent comprises between 0.1% to about 85% by weight, in some embodiments between about 0.5% to about 70% by weight, and in some embodiments, between about 0.5% to about 20% by weight of the total monomer weight of the copolymer.

Other features and aspects of the present invention are discussed in greater detail below.

BRIEF DESCRIPTION OF THE DRAWINGS

A full and enabling disclosure of the present invention, including the best mode thereof to one of ordinary skill in the art, is set forth more particularly in the remainder of the specification, including reference to the accompanying figures in which.

Figure 1:
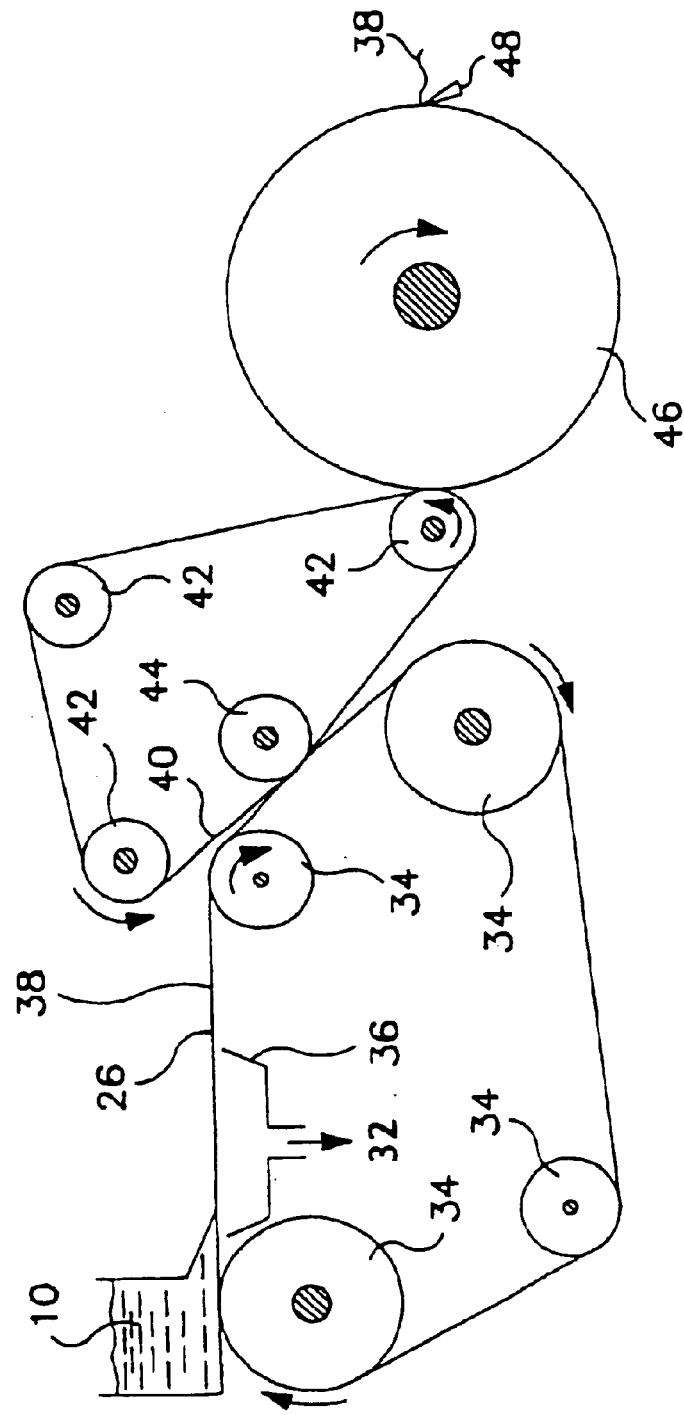
FIG. 1 is illustrates one embodiment of the present invention for forming a tissue product.

Repeat use of reference characters in the present specification and drawings is intended to represent same or analogous features or elements of the present invention.

DETAILED DESCRIPTION OF REPRESENTATIVE EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention covers such modifications and variations as come within the scope of the appended claims and their equivalents.

In general, the present invention is directed to a tissue product that is strong, soft, and produces low amounts of lint and slough. In particular, it has been discovered that a binder that contains a certain copolymer can be incorporated into the tissue product such that the resulting product is strong, soft, and has reduced lint and slough. As used herein, a "tissue product" generally refers to various paper products, such as facial tissue, bath tissue, paper towels, sanitary napkins, and the like. A tissue product of the present invention can generally be produced from a paper web having one or multiple layers. For example, in one embodiment, the paper product can contain a single-layered paper web formed from a blend of fibers. In another embodiment, the paper product can contain a multi-layered paper (i.e., stratified) web. Furthermore, the paper product can also be a single- or multi-ply product (e.g., more than one paper web), wherein one or more of the plies may contain a paper web formed according to the present invention. Normally, the basis weight of a tissue of the present invention is less than about 120 grams per square meter (gsm), in some embodiments less than about 70 grams per square meter, and in some embodiments, between about 10 to about 40 gsm.

Regardless of the overall structure of the tissue product, any of a variety of materials can be used to form the tissue product. For example, the material used to make the tissue product can include fibers formed by a variety of pulping processes, such as kraft pulp, sulfite pulp, thermomechanical pulp, etc.

In some embodiments, the pulp fibers may include softwood fibers having an average fiber length of greater than 1 mm and particularly from about 2 to 5 mm based on a length-weighted average. Such softwood fibers can include, but are not limited to, northern softwood, southern softwood, redwood, red cedar, hemlock, pine (e.g., southern pines), spruce (e.g., black spruce), combinations thereof, and the like. Exemplary commercially available pulp fibers suitable for the present invention include those available from Kimberly-Clark Corporation under the trade designations "Longlac-19".

In some embodiments, hardwood fibers, such as eucalyptus, maple, birch, aspen, and the like, can also be used. In certain instances, eucalyptus fibers may be particularly desired to increase the softness of the web. Eucalyptus fibers can also enhance the brightness, increase the opacity, and change the pore structure of the paper to increase the wicking ability of the paper web. Moreover, if desired, secondary fibers obtained from recycled materials may be used, such as fiber pulp from sources such as, for example, newsprint, reclaimed paperboard, and office waste. Further, other natural fibers can also be used in the present invention, such as abaca, sabai grass, milkweed floss, pineapple leaf, and the like. In addition, in some instances, synthetic fibers can also be utilized. Some suitable synthetic fibers can include, but are not limited to, rayon fibers, ethylene vinyl alcohol copolymer fibers, polyolefin fibers, polyesters, and the like.

As stated, the tissue product of the present invention can be formed from one or more paper webs. The paper webs can be single-layered or multi-layered. For instance, in one embodiment, the paper product contains a single-layered paper web layer that is formed from a blend of fibers. For example, in some instances, eucalyptus and softwood fibers can be homogeneously blended to form the single-layered paper web.

In another embodiment, the tissue product can contain a multi-layered paper web that is formed from a stratified pulp furnish having various principal layers. For example, in one embodiment, the paper product contains three layers where one of the outer layers includes eucalyptus fibers, while the other two layers include northern softwood kraft fibers. In another embodiment, one outer layer and the inner layer can contain eucalyptus fibers, while the remaining outer layer can contain northern softwood kraft fibers. If desired, the three principle layers may also include blends of various types of fibers. For example, in one embodiment, one of the outer layers can contain a blend of eucalyptus fibers and northern softwood kraft fibers. However, it should be understood that the multi-layered paper web can include any number of layers and can be made from various types of fibers. For instance, in one embodiment, the multi-layered paper web can be formed from a stratified pulp furnish having only two principal layers.

In accordance with the present invention, various properties of a paper product, such as described above, can be optimized. For instance, strength (e.g., wet tensile, dry tensile, tear, etc.), softness, lint level, slough level, and the like, are some examples of properties of the paper product that may be optimized in accordance with the present invention. However, it should be understood that each of the properties mentioned above need not be optimized in every instance. For example, in certain applications, it may be desired to form a paper product that has increased strength without regard to softness.

In this regard, at least a portion of the fibers of the tissue product are treated with a binder to increase strength and reduce lint and slough without substantially stiffening the resulting tissue product so that it no longer has a soft feel to consumers. For example, it has been unexpectedly discovered that certain copolymers traditionally used in hair care compositions to enhance the brilliance, gloss, and smooth feeling of the hair can be beneficially utilized as a binder material to reduce lint and slough without causing substantial stiffness in the resulting tissue product. Some examples of such hair care compositions are described in U.S. Pat. No. 5,480,634 to Hayama, et al.; U.S. Pat. No. 5,641,835 to Smith, et al.; U.S. Pat. No. 5,916,547 to Torgerson, et al.; and U.S. Pat. No. 6,074,628 to Bolich, Jr., et al., which are incorporated herein in their entirety by reference thereto for all purposes.

For instance, the binder used in the present invention is a copolymer that is formed from at least an ethylenically unsaturated monomeric constituent and an unsaturated polysiloxane monomeric constituent. The copolymer can be linear (random or block) or branched (graft or crosslinked). It has been discovered that the binder used in the present invention can increase strength and reduce lint and slough of the tissue product. For example, while not wishing to be bound by any particular theory, it is believed that, the binder coats a substantial portion of the fiber-to-fiber crossover points when applied to a paper web. As a result, it is believed that the loose fibers present within the web are "held down" by the binder, thereby inhibiting lint and slough that would otherwise result from such loose surface fibers. In addition, it has also been discovered that the binder does not substantially increase the stiffness of the resulting tissue product. In particular, it is believed that, due to the flexibility and construction of the binder, it preferentially coats the fiber-to-fiber crossover points when it is applied to a paper web. As a result, only a relatively small amount of the binder is believed to actually form a coating on the fibers themselves. Thus, because much of the actual fibers are left uncoated, such fibers remain free to move so that the resulting tissue product is relatively flexible. In addition, the binder is also relatively non-tacky when dried.

One embodiment of such a binder copolymer will now be described in more detail. Specifically, the copolymer of this embodiment is obtained by copolymerizing (a) at least one ethylenically unsaturated monomer, (b) an unsaturated polysiloxane monomer, and (c) optionally, other additional unsaturated monomers.

In general, any ethylenically unsaturated monomer may be utilized in the present invention. Some suitable ethylenically unsaturated monomers that can be used in the present invention include, but are not limited to, acrylic acid, methacrylic acid, and derivatives thereof. For instance, acrylamides or amino acrylates, such as dimethylaminoethyl (meth)acrylate or acrylate, diethylaminoethyl (meth)acrylate or acrylate, dimethylaminopropyl (meth)acrylate or acrylate, dimethylaminopropyl (meth)acrylamide or acrylamide, acryl ethers, as well as their crotonates and tiglates, mixtures thereof, and the like, can be utilized in the present invention. Other examples of suitable ethylenically unsaturated monomers may be described in U.S. Pat. No. 6,177,063 to Hutchins, U.S. Pat. No. 5,789,516 to Graiver, et al., and U.S. Pat. No. 5,916,547 to Torgerson, et al., which are incorporated herein in their entirety by reference thereto for all purposes.

In some embodiments, the ethylenically unsaturated monomer may also be selected to possess certain properties. For example, in some embodiments, the hydrophilic nature of the ethylenically unsaturated monomer may be controlled to aid in the deposition of the binder onto the web. For instance, it may be desirable to utilize an ethylenically unsaturated monomer that is relatively hydrophilic (e.g., water solubility of greater than about 10 grams per 100 grams of water at 25° C.) so that the binder can more readily dissolve in the liquid suspension of fibers.

Further, if desired, the ethylenically unsaturated monomer may also be relatively hydrophobic (e.g., a water solubility of less than about 10 grams per 100 grams of water at 25° C.). Examples of some suitable hydrophobic unsaturated monomers include, but are not limited to, saturated and unsaturated alkyl (meth)acrylates having 1 to 24 carbon atoms in the alkyl such as methyl (meth)acrylate, allyl (meth)acrylate, isobutyl (meth)acrylate, cyclohexyl (meth)acrylate, octyl (meth)acrylate, lauryl (meth)acrylate, oleyl (meth)acrylate, behenyl (meth)acrylate and the like; hydrophobic (meth)acrylates and their derivatives such as butoxyethyl (meth)acrylate, benzyl (meth)acrylate, tetrahydrofurfuryl (meth)acrylate, ethyleneglycol di(meth)acrylate, 1,3-butyleneglycol di(meth)acrylate, diacetonacrylamide and the like; aromatic unsaturated monomers such as styrene, chlorostyrene, vinyltoluene and the like; and vinyl esters such as vinyl acetate and the like. In one embodiment, for example, a hydrophobic acrylate monomer having the following formula can be utilized:

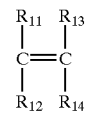

wherein, $R_{11}$, $R_{12}$, and $R_{13}$ are the same or different, and can be selected from the group consisting of hydrogen and a $C_1$–$C_4$ alkyl group; and $R_{14}$ is a hydrophobic group, such as an acrylic- or methacrylic-based ester having an alkyl chain length of $C_1$–$C_{40}$. In this embodiment, the $R_{14}$ group can provide the acrylic monomer with relatively hydrophobic properties.

Besides selecting the hydrophilic nature, the ionic charge of the ethylenically unsaturated monomer can also be selected to provide certain properties to the resulting binder. For example, in some embodiments, it may be desired to utilize an ethylenically unsaturated monomer that is cationic so that the binder can more readily adhere to anionically charged pulp fibers. However, anionic, cationic, and/or amphoteric binders are generally equally suitable.

In addition, as stated above, a binder of the present invention also includes an unsaturated polysiloxane monomeric constituent. Some examples of suitable siloxane monomers may be described in U.S. Pat. No. 6,224,714 to Schroeder, et al., U.S. Pat. No. 6,177,063 to Hutchins, U.S. Pat. No. 5,789,516 to Graiver, et al., and U.S. Pat. No. 5,916,547 to Torgerson, et al., which are incorporated herein in their entirety by reference thereto for all purposes. In some embodiments, for example, the unsaturated polysiloxane monomer has the following formula:

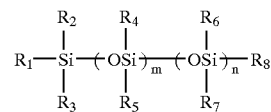

wherein, $R_1$ is an ethylenically unsaturated group that has free radical polymerizability; and $R_2$, $R_3$, $R_4$, $R_5$, $R_6$, $R_7$, and $R_8$ are the same or different, and can be selected from the group consisting of hydrogen, an aryl group, an alkyl group, a substituted alkyl or aryl group, an ethoxy group, and a propoxy group;

m is an integer from 4 to 15,000; and n is an integer from 0 to 15,000.

The siloxane group of the unsaturated polysiloxane monomer can be contained as a pendant group. In one embodiment, for example, an unsaturated polysiloxane monomer that contains a siloxane unit as a pendant group and has the following formula can be utilized:

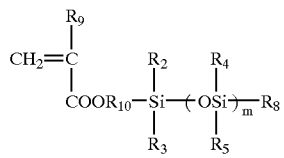

wherein, $R_2$, $R_3$, $R_4$, $R_5$, and $R_8$ are the same or different, and can be selected from the group consisting of hydrogen; an aryl group; an alkyl group; a substituted alkyl or aryl group; an ethoxy group; a propoxy group; and an amino group;

$R_9$ is hydrogen or a $C_1$–$C_4$ alkyl group;

$R_{10}$ is a $C_1$–$C_4$ alkyl or a $C_1$–$C_4$ alkylene group (e.g., $C_3H_6$); and m is between 4 to 500.

In addition to the monomers described above, it should be understood that the copolymer binder used in the present invention can also contain other monomer constituents if desired. For example, other monomers that can be used in the present invention may be described in U.S. Pat. No. 5,480,634 to Hayama, et al.

The monomeric constituents described above can be utilized in various amounts to obtain a copolymerized binder having various characteristics. For example, in some embodiments, the total amount of ethylenically unsaturated monomeric constituent utilized is greater than about 15% by weight of the total monomer weight. For instance, when utilized, a hydrophobic acrylic monomer can be present in an amount up to about 85% by weight to the total monomer weight. Moreover, in some embodiments, the polysiloxane unsaturated monomeric constituent is utilized in an amount between about 0.1% to about 85% by weight, in some embodiments between about 0.5% to about 70% by weight, and in some embodiments, between about 0.5% to about 20% by weight of the total monomer weight. It should be understood, however, that the amount of monomeric constituents utilized can be varied as desired to achieve certain binder properties. For instance, the ratio of hydrophilic ethylenically unsaturated monomer(s) to hydrophobic unsaturated monomer(s) can be increased or decreased to vary the hydrophobicity of the binder composition. In addition, the amount of the monomers utilized may also depend on other factors, such as the copolymerizability or the conversion of the components such that the resulting copolymer has a predetermined composition.

The monomers used to form the binder can be copolymerized by any well-technique known in the art. For example, in one embodiment, the monomers can be polymerized using well-known radical polymerization methods, such as bulk polymerization, solution polymerization, suspension polymerization, emulsion polymerization, and the like. Solution polymerization, for example, is conducted by a process that includes dissolving the monomers in a solvent, adding a polymerization initiator (e.g., benzoyl peroxide; lauroyl peroxide; an azo compound, such as azobisisobutyronitrile; etc.), and stirring and heating the mixture under a nitrogen stream. The monomers are usually added simultaneously from the initiation of polymerization, but may also be added separately if desired. In some embodiments, the solvent can be water and/or alcohol, such as methanol, ethanol, isopropanol, ethyleneglycol and butylcellosolve. Typically, the solvent is used in such an amount that the resulting copolymer solution has a polymer concentration of between about 10% to about 65% by weight of the solution.

The molecular weight of the copolymer can be varied as desired by appropriately selecting the polymerization conditions, i.e., polymerization temperature, the type and amount of polymerization initiators, addition methods, the amount of solvent used, the use of chain transfer agents, and the like. In some embodiments, for example, the resulting copolymer has a molecular weight in the range of 1,000 to 500,000.

In accordance with the present invention, the copolymerized binder can then be incorporated into a tissue product before, during, and/or after formation of the tissue product. In general, tissue products of the present invention can be formed by any of a variety of papermaking processes known in the art. For example, a papermaking process of the present invention can utilize adhesive creping, wet creping, double creping, embossing, wet-pressing, air pressing, through-air drying, creped through-air drying, uncreped through-drying, air laying, as well as other steps in forming the paper web. Some examples of such techniques are disclosed in U.S. Pat. No. 5,048,589 to Cook, et al.; U.S. Pat. No. 5,399,412 to Sudall, et al.; U.S. Pat. No. 5,129,988 to Farrington, Jr.; U.S. Pat. No. 5,494,554 to Edwards, et al.; which are incorporated herein in their entirety by reference thereto for all purposes.

In this regard, referring to FIG. 1, one embodiment of a papermaking process that can be used in the present invention is illustrated. Initially, a fibrous material is placed in a conventional paper making fiber stock prep beater or pulper (not shown) containing a liquid, such as water. If the fibers are cellulosic in nature, for example, the fibers may be refined in the beater or pulper until they become hydrated with the water. The fibrous material stock is typically kept in continued agitation such that it forms a liquid suspension can be formed.

The fibrous suspension can then be diluted and readied for formation into a layer of fibrous web using conventional papermaking techniques. In this regard, the fibrous suspension (i.e., stock slurry) may be stored in any apparatus, such as in a machine chest (not shown), prior to forming the web. If desired, the pH of the stock slurry can also be adjusted for equipment compatibility.

From the stock-preparation stage, the fibrous slurry can then be transferred to the web-forming stage. For example, as shown, a papermaking headbox 10 can be used to inject or deposit an aqueous suspension of papermaking fibers onto an endless traveling forming fabric 26, suitably supported and driven by rolls 34. The headbox 10 may be any tissue-forming headbox used in the art, such as a stratified headbox capable of producing a multilayered web. For example, it may be desirable to provide relatively short or straight fibers in one layer of the basesheet to give a layer with high capillary pressure, while the other layer comprises relatively longer, bulkier, or more curled fibers for high permeability and high absorbent capacity and high pore volume. It may also be desirable to apply different chemical agents to separate layers of a single web to optimize dry and wet strength, pore space, wetting angle, appearance, or other properties of a web. Further, multiple headboxes may be used to create a layered structure, as is known in the art. It should be understood, however, that a multilayered paper web, such as described above, can be formed without using stratified or multiple headboxes, and can generally be formed according to any process known in the art.

Once retained on the fabric 26, the fiber suspension passes water through the fabric as shown by the arrow 32. Water removal is achieved by combinations of gravity, centrifugal force and vacuum suction depending on the particular forming configuration.

From the forming fabric 26, a formed web 38 is transferred to a second fabric 40, which may be either a fabric or a felt. The fabric 40 is supported for movement around a continuous path by a plurality of guide rolls 42. Also included is a pick-up roll 44 designed to facilitate transfer of the web 38 from the fabric 26 to the fabric 40. Alternatively, besides the roll 44, a stationary pick-up shoe can also be used to facilitate transfer of the web. In some embodiments, the speed at which the fabric 40 is driven is slower than the speed at which the fabric 26 is driven to impart increased stretch into the web. This is commonly referred to as "rush" transfer. One useful method of performing rush transfer is taught in U.S. Pat. No. 5,667,636 to Engel et al., which is incorporated herein in its entirety by reference thereto. The relative speed difference between the two fabrics can be from 0% to about 80%, particularly greater than about 10%, more particularly from about 10% to about 60%, and most particularly from about 10% to about 40%. Transfer may be carried out with the assistance of a vacuum shoe such that the forming fabric and the transfer fabric simultaneously converge and diverge at the leading edge of the vacuum slot.

From the fabric 40, in this embodiment, the web 38 is pressed into engagement with the surface of a rotational dryer drum 46, such as a Yankee dryer, to which it adheres due to its moisture content and its preference for the smoother of the two surfaces. In some cases, however, a creping adhesive, such as an ethylene vinyl acetate or polyvinyl alcohol, can be applied over the web surface or drum surface to facilitate attachment of the web to the drum.

As the web 38 is carried through a portion of the rotational path of the dryer surface, heat is imparted to the web causing most of the moisture contained within the web to be evaporated. The web 38 is then removed from dryer drum 46 by a creping blade 48. Although optional, creping the web 38 as it is formed further reduces internal bonding within the web and increases softness.

If desired, certain additives can also be applied to the paper web 38 as it traverses over the drum 46. For example, additives, such as debonders or strength agents, can be applied to the surface of the drum 46 separately and/or in combination with the creping adhesives such that the additive is applied to an outer layer of the web 38 as it passes over the drum 46. Additives can be applied to the web 38 by any conventional method, such as through the use of a spray boom that evenly sprays the surface of the dryer with the creping adhesive solution. In some embodiments, the point of application on the surface of the dryer is the point immediately following the creping blade 48, thereby permitting sufficient time for the spreading and drying of the film of fresh adhesive before contacting the web in the press roll nip. Methods and techniques for applying an additive to a dryer drum are described in more detail in U.S. Pat. No. 5,853,539 to Smith, et al. and U.S. Pat. No. 5,993,602 to Smith, et al., which are incorporated herein in their entirety by reference thereto for all purposes.

It should also be understood that the web 38 can be dried using non-compressive drying techniques, such as through-air drying. In fact, in certain circumstances, depending on the desired tissue product, non-compressive drying techniques may actually be desired. For instance, a through-air dryer accomplishes the removal of moisture from the web by passing air through the web without applying any mechanical pressure. Through-air drying can increase the bulk and softness of the web. Examples of such a technique, also known as "uncreped through-air drying", are disclosed in U.S. Pat. No. 5,048,589 to Cook, et al.; U.S. Pat. No. 5,399,412 to Sudall, et al.; U.S. Pat. No. 5,510,001 to Hermans, et al.; U.S. Pat. No. 5,591,309 to Rugowski, et al.; and U.S. Pat. No. 6,017,417 to Wendt, et al., which are incorporated herein in their entirety by reference thereto for all purposes.

Regardless of the technique used to dry the web 38, the dried web can then be transported to a reel (not shown), where it can be wound. Although not shown, reel calendering or subsequent off-line calendering can be used to improve the smoothness and softness of the basesheet. Besides calendering, any of a variety of other finishing steps can also be utilized. For example, the web may be brushed to provide a uniform exterior appearance and/or certain tactile properties. The material can also be wet creped, dry creped, and/or mechanically softened via other methods to improve softness and hand. Such processes can be in-line prior to winding up the fabric onto a roll, or they can be off-line. Adhesive recreping can be further used to improve strength and bulk properties. In addition, printed finishes can be applied to improve aesthetics.

Referring again to FIG. 1, the flexible binder used in the present invention may generally be applied during any of the stages of the papermaking process (e.g., stock preparation, web-forming, converting, etc.). For example, in some embodiments, the binder can be applied during the web-forming stage. The web-forming stage generally refers to steps of a papermaking process that occur after the fibers are deposited on the forming fabric or wire, and before the web is dried. For example, in one embodiment, the binder may be applied (e.g., sprayed) to the wet web 38 just prior to being dried by the dryer 46. For instance, the binder can be applied to the dryer 46 in a manner similar to a creping adhesive or other additive, such as described above.

The binder can also be applied to a substantially dried web via printing, spraying, and the like. In one embodiment, the binder to both sides of the tissue product using a rotogravure printer, which first prints on one side and then the other. Such a rotogravure printer produces a printing pattern that is uniform and provided by printing cells of a certain micron size and spaced apart by a certain number of microns.

Regardless of the method utilized to apply the binder, the total amount of binder is typically kept at a relatively low level. For instance, in some embodiments, the amount of total binder applied to the web is between about 0.02% to about 5% by weight, in some embodiments between about 0.05% to about 3% by weight, and in some embodiments, between about 0.1% to about 2% by weight of total fiber within the web applied with the binder. In addition, the binder can be applied in any of a variety of different patterns onto the web. For instance, in one embodiment, the binder can be applied to a pattern-densified web having elevated and depressed regions such that substantially all of the binder resides only on the elevated regions of the web.

Besides the binder, additional chemical treatments can also be utilized at any stage of the papermaking process. For example, application of liquid treatments such as dyes, brighteners, flame retardants, germicides, softening agents, starches, corrosion inhibitors, textile finishes, citric acid, ethylene diamine, etc., can be accomplished using spraying, dipping, squeeze techniques, vacuum extraction, liquid curtains, saturation techniques, and the like.

For example, a tissue product of the present invention can include a chemical debonding or softening agent to further enhance the "soft feel" to the tissue product. Some softening agents are also believed to act as lubricants or friction reducers. Any material that has some affinity to fibers and is capable of reducing fiber bonding and/or reducing friction, can generally be used as a softening agent. Some examples of suitable softening agents can include, but are not limited to, quaternary ammonium compounds, imidazolinium compounds, bis-imidazolinium compounds, phospholipid derivatives, polydimethylsiloxanes and related cationic and non-ionic silicone compounds, fatty & carboxylic derivatives, mono- and polysaccharide derivatives, polyhydroxy hydrocarbons, etc. Still other suitable softening agents are disclosed in U.S. Pat. No. 5,529,665 to Kaun and U.S. Pat. No. 5,558,873 to Funk, et al., which are incorporated herein in their entirety by reference thereto for all purposes. For example, Kaun discloses the use of various silicone compositions as softening agents. Additional additives and/or softening agents are described in U.S. Pat. No. 5,814,188 to Vinson, et al. and U.S. Pat. No. 5,830,317 to Vinson et al., which are incorporated herein in their entirety by reference thereto for all purposes.

Furthermore, as indicated above, strength agents may also be utilized. For instance, some strength agents that may be used in the present invention include, but are not limited to, latex compositions; such as acrylates, vinyl acetates, vinyl chlorides, and methacrylates; polyamine/amide epichlorohydrins, epoxides, polyethyleneimines, etc.

When utilizing a wet-strength agent, permanent and/or temporary wet-strength agents may be utilized. Some conventional permanent wet-strength agents are described in U.S. Pat. Nos. 2,345,543, 2,926,116; and 2,926,154. Other permanent wet-strength agents that can be used in the present invention include polyamine-epichlorohydrin, polyamide epichlorohydrin or polyamide-amine epichlorohydrin resins, which are collectively termed "PAE resins". These materials have been described in U.S. Pat. No. 3,700,623 to Keim and U.S. Pat. No. 3,772,076 to Keim, which are incorporated herein in their entirety by reference thereto for all purposes and are sold by Hercules, Inc., Wilmington, Del., as "Kymene" e.g., Kymene 557H or Kymene 557LX.

As stated, temporary wet-strength agents may also be utilized. Some suitable temporary wet-strength agents can include, but are not limited to, dialdehyde starch, polyethylene imine, mannogalactan gum, glyoxal, and dialdehyde mannogalactan. Other suitable temporary wet-strength agents are described in U.S. Pat. No. 3,556,932 to Coscia et al.; U.S. Pat. No. 5,466,337 to Darlington, et al., U.S. Pat. No. 3,556,933 to Williams et al., U.S. Pat. No. 4,605,702 to Guerro et al., U.S. Pat. No. 4,603,176 to Bjorkquist et al., U.S. Pat. No. 5,935,383 to Sun, et al., and U.S. Pat. No. 6,017,417 to Wendt, et al., which are incorporated herein in their entirety by reference thereto for all purposes.

The present invention may be better understood with reference to the following examples:

EXAMPLE 1

The ability to form a tissue with a binder of the present invention was demonstrated. Initially, an uncreped through-dried basesheet was formed in a manner such as described above. The basesheet had a basis weight of about 30.4 grams per square meter. Multiple tissue samples were cut from the basesheet using a die cutter such that each sample had a weight of approximately 0.50 grams.

Once formed, the dried basesheet was then applied with three (3) flexible binders that contained an acrylate/siloxane copolymer. In particular, VS Sassoon® Flexible Hair Spray (aerosol spray), VS Sassoon® Flexible Hair Spray (non-aerosol pump) and Pantene Pro-V® Sheer Strength Healthy Hold Spray (aerosol spray) were each tested. The aerosol sprays were applied using a single pass of a fine mist of the spray over the tissue sample. For the non-aerosol spray, 3 pumps of the spray bottle were utilized to get full coverage of the tissue sheet.

The ingredients of these sprays are believed to be as follows:

VS Sassoon® Flexible Hair Spray (Aerosol Spray)

Acrylate/dimethicone copolymer, SD Alcohol 40, isobutane, dimethyl ether, water, octylacrylamide/acrylates/butylaminoethyl methacrylate copolymer, phenyl trimethicone, isododecane, potassium hydroxide, diisobutyl adipate, ammonium benzoate, fragrance, aminomethyl propanol, octyl salicylate, and myristoyl hydrolyzed collagen.

VS Sassoon® Flexible Hair Spray (Non-Aerosol Pump)

Acrylate/dimethicone copolymer, SD Alcohol 40, water, potassium hydroxide, diisobutyl adipate, fragrance, octyl salicylate, and myristoyl hydrolyzed collagen.

Pantene® Pro-V® Sheer Strength Healthy Hold Spray (Aerosol Spray)

Acrylate/dimethicone copolymer, SD Alcohol 40, water, dimethyl ether, isobutane, panthenol, isododecane, potassium hydroxide, diisobutyl adipate, ammonium benzoate, cyclohexylamine, and fragrance.

Pantene Pro V® and VS Sassoon® (aerosol) were applied to the tissue samples at a target level of 1.25 wt. % solids, while the VS Sassoon® (non-aerosol) was applied to the tissue sample at a target level of 2.5 wt. % solids. In particular, the amount of hairspray used was simulated in a weigh boat as set forth below in Table I.

TABLE I

| | Add-On Level | | | |
|---|---|---|---|---|
| | Boat initial wt. | Boat final wt. | Calculated Binder Wt. | Add-On Level* |
| Pantene Pro V ® | 5.582 | 5.588 | 0.006 | 1.2% |
| VS Sassoon ® (aerosol) | 5.590 | 5.596 | 0.006 | 1.2% |
| VS Sassoon ® (non-aerosol) | 5.534 | 5.547 | 0.013 | 2.6% |

*Calculated for a tissue weight of approximately 0.50 grams.

Various properties of the tissue samples were then determined. Specifically, the tensile strength and slough were measured as follows:

Tensile Strength

Tensile properties of the webs were measured on a Sintech 500/S Model, obtained from MTS Systems Corporation.

Slough

Figure 2:
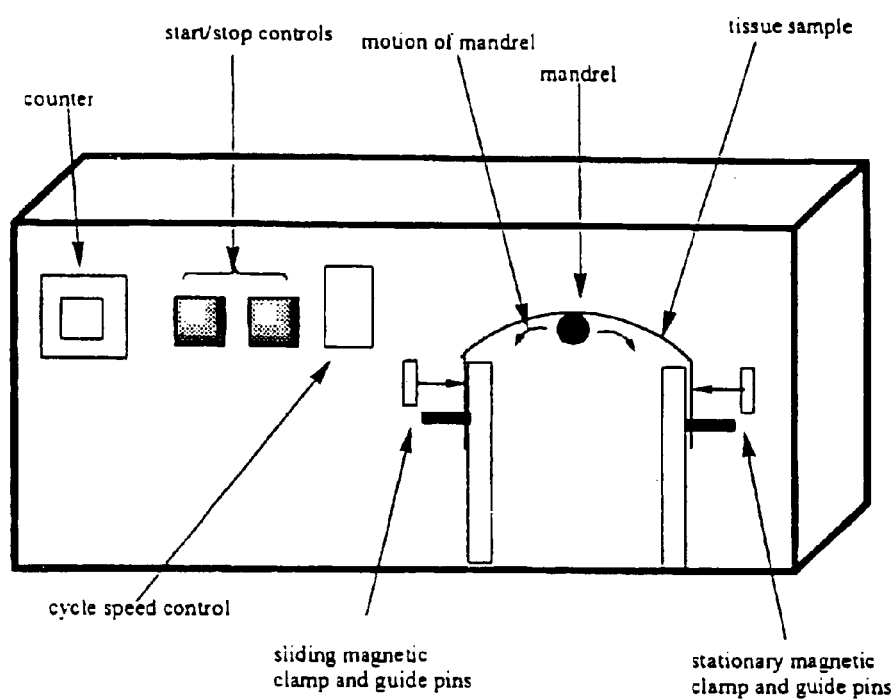
FIG. 2 is a schematic illustration of one example of an apparatus that can be used to measure the slough of a tissue product.

In order to determine the abrasion resistance or tendency of the fibers to be rubbed from the web when handled, each sample was measured by abrading the tissue specimens via the following method. This test measures the resistance of tissue material to abrasive action when the material is subjected to a horizontally reciprocating surface abrader. All samples were conditioned at 23° C.±1° C. and 50±2% relative humidity for a minimum of 4 hours. FIG. 2 shows a diagram of the test equipment.

The abrading spindle contained a stainless steel rod, 0.5" in diameter with the abrasive portion consisting of a 0.005" deep diamond pattern extending 4.25" in length around the entire circumference of the rod. The spindle was mounted perpendicularly to the face of the instrument such that the abrasive portion of the rod extends out its entire distance from the face of the instrument. On each side of the spindle were located guide pins with magnetic clamps, one movable and one fixed, spaced 4" apart and centered about the spindle. The movable clamp and guide pins were allowed to slide freely in the vertical direction, the weight of the jaw providing the means for insuring a constant tension of the sample over the spindle surface.

Using a die press with a die cutter, the specimens were cut into 3"±0.05" wide×8" long strips with two holes at each end of the sample. For the tissue samples, the MD direction corresponds to the longer dimension. Each test strip was then weighed to the nearest 0.1 mg. Each end of the sample was slid onto the guide pins and magnetic clamps held the sheet in place. The movable jaw was then allowed to fall providing constant tension across the spindle.

The spindle was then moved back and forth at an approximate 15 degree angle from the centered vertical centerline in a reciprocal horizontal motion against the test strip for 20 cycles (each cycle is a back and forth stroke), at a speed of 80 cycles per minute, removing loose fibers from the web surface. Additionally, the spindle rotated counter clockwise (when looking at the front of the instrument) at an approximate speed of 5 RPMs. The magnetic clamp was then removed from the sample and the sample was slid off of the guide pins and any loose fibers on the sample surface are removed by blowing compressed air (approximately 5–10 psi) on the test sample. The test sample was then weighed to the nearest 0.1 mg and the weight loss calculated. Ten test samples per tissue sample were tested and the average weight loss value in milligrams was recorded.

The results for each sample were compared with a control sample that did not contain a binder. The results are shown below in Table II.

TABLE II

Tensile Strength and Slough Results

| | Peak Load (grams/3 inches) | % Change | Slough (mg) | % Change |
|---|---|---|---|---|
| Untreated | 743.85 | NA | 14.6 | NA |
| Pantene Pro V ® | 801.47 | 8% | 8.6 | −41% |
| VS Sassoon ® (aerosol) | 882.35 | 19% | 7.9 | −46% |
| VS Sassoon ® (non-aerosol) | 1205.08 | 62% | 3.5 | −76% |

Thus, as indicated above, the tissue samples treated with a flexible binder in accordance with the present invention had a greater tensile strength and a reduced slough in comparison to an untreated tissue sample.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A soft tissue product that has a relatively low level of lint and slough, said tissue product comprising:
    at least one paper web formed from a cellulosic fibrous material; and
    a flexible binder applied to said paper web, said flexible binder being a copolymer formed from at least the following monomeric constituents:
    a) an ethylenically unsaturated monomeric constituent containing one or more hydrophobic ethylenically unsaturated monomers having the following formula:

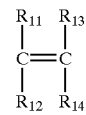

wherein, $R_{11}$, $R_{12}$, and $R_{13}$ are the same or different, and are selected from the group consisting of hydrogen and a $C_1$–$C_4$ alkyl group; and $R_{14}$ is a hydrophobic group, wherein said one or more hydrophobic ethylenically unsaturated monomers form greater than about 15% by weight of the total monomer weight of said copolymer; and b) an unsaturated polysiloxane monomeric constituent containing one or more unsaturated polysiloxane monomers, wherein said unsaturated polysiloxane monomeric constituent contains at least one unsaturated polysiloxane monomer having the following formula:

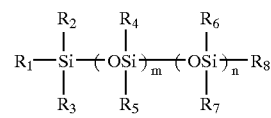

wherein, $R_1$ is an ethylenically unsaturated group that has free radical polymerizability; and $R_2$, $R_3$, $R_4$, $R_5$, $R_6$, $R_7$, and $R_8$ are the same or different, and are selected from the group consisting of hydrogen, an aryl group, an alkyl group, a substituted alkyl or aryl group, an ethoxy group, and a propoxy group;

m is an integer from 4 to 15,000; and n is an integer from 0 to 15,000.

2. A tissue product as defined in claim 1, wherein said ethylenically unsaturated monomeric constituent contains one or more additional ethylenically unsaturated monomers.

3. A tissue product as defined in claim 1, wherein said unsaturated polysiloxane monomeric constituent contains at least one unsaturated polysiloxane monomer having the following formula:

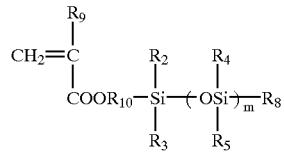

wherein, $R_2$, $R_3$, $R_4$, $R_5$, and $R_8$ are the same or different, and are selected from the group consisting of hydrogen; an aryl group; an alkyl group; a substituted alkyl or aryl group; an ethoxy group; a propoxy group; and an amino group;

$R_9$ is hydrogen or a $C_1$–$C_4$ alkyl group;

$R_{10}$ is a $C_1$–$C_4$ alkyl or a $C_1$–$C_4$ alkylene group; and m is between 4 to 500.

4. A tissue product as defined in claim 3, wherein $R_{10}$ is a $C_3$ alkylene having the formula, $C_3H_6$.

5. A tissue product as defined in claim 2, wherein said one or more additional ethylenically unsaturated monomers include at least one hydrophilic ethylenically unsaturated monomer.

6. A tissue product as defined in claim 5, wherein said hydrophilic ethylenically unsaturated monomer is cationic.

7. A tissue product as defined in claim 5, wherein said at least one hydrophilic ethylenically unsaturated monomer is selected from the group consisting of acrylic acid, methacrylic acid, and combinations thereof.

8. A tissue product as defined in claim 1, wherein said ethylenically unsaturated monomeric constituent contains at least two ethylenically unsaturated monomers.

9. A tissue product as defined in claim 1, wherein $R_{14}$ is an acrylic- or methacrylic-based ester having an alkyl chain length of $C_1$–$C_{40}$.

10. A tissue product as defined in claim 1, wherein said unsaturated polysiloxane monomeric constituent forms between about 0.1% to less than about 85% by weight of the total monomer weight of said copolymer.

11. A tissue product as defined in claim 1, wherein said unsaturated polysiloxane monomeric constituent forms between about 0.5% to about 70% by weight of the total monomer weight of said copolymer.

12. A tissue product as defined in claim 1, wherein said unsaturated polysiloxane monomeric constituent forms between about 0.5% to about 20% by weight of the total monomer weight of said copolymer.

13. A tissue product as defined in claim 1, wherein the basis weight of said tissue product is less than about 120 grams per square meter.

14. A tissue product as defined in claim 1, wherein the basis weight of said tissue product is less than about 70 grams per square meter.

15. A tissue product as defined in claim 1, wherein the amount of total binder applied to said paper web is between about 0.02% to about 5% by weight of total fiber within said web.

16. A tissue product as defined in claim 1, wherein the amount of total binder applied to said paper web is between about 0.05% to about 3% by weight of total fiber within said web.

17. A tissue product as defined in claim 1, wherein the amount of total binder applied to said paper web is between about 0.1% to about 2% by weight of total fiber within said web.

18. A soft tissue product having a basis weight less than about 120 grams per square meter and having a relatively low level of lint and slough, said tissue product comprising:

at least one paper web formed from a cellulosic fibrous material; and a flexible binder applied to said paper web in an amount between about 0.02% to about 5% by weight of total fiber within said web, said flexible binder being a copolymer formed from at least the following monomeric constituents:

a) an ethylenically unsaturated monomeric constituent containing one or more hydrophobic ethylenically unsaturated monomers having the following formula:

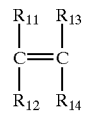

wherein, $R_{11}$, $R_{12}$, and $R_{13}$ are the same or different, and are selected from the group consisting of hydrogen and a $C_1$–$C_4$ alkyl group; and $R_{14}$ is a hydrophobic group, said one or more hydrophobic ethylenically unsaturated monomers forming greater than about 15% by weight of the total monomer weight of said copolymer, wherein said ethylenically unsaturated monomeric constituent contains at least one additional ethylenically unsaturated monomer, wherein said at least one additional ethylenically unsaturated monomer is hydrophilic and is selected from the group consisting of acrylic acid, methacrylic acid, and combinations thereof; and b) an unsaturated polysiloxane monomeric constituent containing one or more unsaturated polysiloxane monomers, said unsaturated polysiloxane monomeric constituent forming between about 0.1% to less than about 85% by weight of the total monomer weight of said copolymer, wherein said unsaturated polysiloxane monomeric constituent contains at least one unsaturated polysiloxane monomer having the following formula:

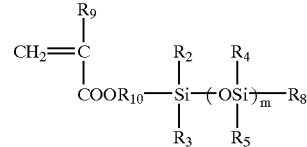

wherein, $R_2$, $R_3$, $R_4$, $R_5$, and $R_8$ are the same or different, and are selected from the group consisting of hydrogen, an aryl group, an alkyl group, a substituted alkyl or aryl group, an ethoxy group, a propoxy group, and an amino group;

$R_9$ is hydrogen or a $C_1$–$C_4$ alkyl group;

$R_{10}$ is a $C_1$–$C_4$ alkyl or a $C_1$–$C_4$ alkylene group; and m is between 4 to 500.

19. A tissue product as defined in claim 18, wherein said ethylenically unsaturated monomeric constituent contains one or more additional ethylenically unsaturated monomers.

20. A tissue product as defined in claim 18, wherein $R_{10}$ is a $C_3$ alkylene having the formula, $C_3H_6$.

21. A tissue product as defined in claim 18, wherein $R_{14}$ is an acrylic- or methacrylic-based ester having an alkyl chain length of $C_1$–$C_{40}$.

22. A tissue product as defined in claim 18, wherein said unsaturated polysiloxane monomeric constituent forms between about 0.5% to about 70% by weight of the total monomer weight of said copolymer.

23. A tissue product as defined in claim 18, wherein said unsaturated polysiloxane monomeric constituent forms between about 0.5% to about 20% by weight of the total monomer weight of said copolymer.

24. A tissue product as defined in claim 19, wherein said one or more additional ethylenically unsaturated monomers include at least one hydrophilic ethylenically unsaturated monomer.

25. A tissue product as defined in claim 24, wherein said hydrophilic ethylenically unsaturated monomer is cationic.

26. A tissue product as defined in claim 1, wherein said one or more hydrophobic ethylenically unsaturated monomers form up to about 85% by weight of the total monomer weight of said copolymer.

27. A tissue product as defined in claim 18, wherein said one or more hydrophobic ethylenically unsaturated monomers form up to about 85% by weight of the total monomer weight of said copolymer.

28. A tissue product as defined in claim 1, wherein said one or more hydrophobic ethylenically unsaturated monomers are selected from the group consisting of: unsaturated alkyl (meth)acrylates having 1 to 24 carbon atoms in the alkyl group; hydrophobic (meth)acrylates and their derivatives; aromatic unsaturated monomers; and vinyl esters.

29. A tissue product as defined in claim 1, wherein said one or more hydrophobic ethylenically unsaturated monomers are selected from the group consisting of: methyl (meth)acrylate, allyl (meth)acrylate, isobutyl (meth)acrylate, cyclohexyl (meth)acrylate, octyl (meth)acrylate, lauryl (meth)acrylate, oleyl (meth)acrylate, behenyl (meth)acrylate, butoxyethyl (meth)acrylate, benzyl (meth)acrylate, tetrahydrofurfuryl (meth)acrylate, ethyleneglycol di(meth)acrylate, 1,3-butyleneglycol di(meth)acrylate, diacetonacrylamide, styrene, chlorostyrene, vinyltoluene, and vinyl acetate.

30. A tissue product as defined in claim 18, wherein said one or more hydrophobic ethylenically unsaturated monomers are selected from the group consisting of: unsaturated alkyl (meth)acrylates having 1 to 24 carbon atoms in the alkyl group; hydrophobic (meth)acrylates and their derivatives; aromatic unsaturated monomers; and vinyl esters.

31. A tissue product as defined in claim 18, wherein said one or more hydrophobic ethylenically unsaturated monomers are selected from the group consisting of: methyl (meth)acrylate, allyl (meth)acrylate, isobutyl (meth)acrylate, cyclohexyl (meth)acrylate, octyl (meth)acrylate, lauryl (meth)acrylate, oleyl (meth)acrylate, behenyl (meth)acrylate, butoxyethyl (meth)acrylate, benzyl (meth)acrylate, tetrahydrofurfuryl (meth)acrylate, ethyleneglycol di(meth)acrylate, 1,3-butyleneglycol di(meth)acrylate, diacetonacrylamide, styrene, chlorostyrene, vinyltoluene, and vinyl acetate.

* * * * *